US009235271B2

(12) United States Patent
Berg

(10) Patent No.: US 9,235,271 B2
(45) Date of Patent: Jan. 12, 2016

(54) KEYBOARD ARRANGEMENT IN FOUR GROUPS

(75) Inventor: Richard Steenfeldt Berg, Oslo (NO)

(73) Assignee: HYPERTEC MOBILE AS, Oslo (NO)

( * ) Notice: Subject to any disclaimer, the term of this patent is extended or adjusted under 35 U.S.C. 154(b) by 438 days.

(21) Appl. No.: 12/990,600

(22) PCT Filed: Apr. 16, 2009

(86) PCT No.: PCT/NO2009/000146
§ 371 (c)(1),
(2), (4) Date: Nov. 1, 2010

(87) PCT Pub. No.: WO2009/134134
PCT Pub. Date: Nov. 5, 2009

(65) Prior Publication Data
US 2011/0050581 A1    Mar. 3, 2011

(30) Foreign Application Priority Data

May 2, 2008    (NO) .................................. 20082076

(51) Int. Cl.
*G06F 3/02* (2006.01)
*G06F 1/16* (2006.01)

(52) U.S. Cl.
CPC .............. *G06F 3/0213* (2013.01); *G06F 1/169* (2013.01)

(58) Field of Classification Search
CPC ..... G06F 3/0202; G06F 3/021; G06F 3/0213; G06F 3/0216; G06F 3/0219; G06F 3/02; G06F 3/0221; G06F 3/0238
USPC ................................................. 345/163–179
See application file for complete search history.

(56) References Cited

U.S. PATENT DOCUMENTS

| | | | |
|---|---|---|---|
| 5,503,484 A * | 4/1996 | Louis | 248/118.1 |
| 5,689,253 A * | 11/1997 | Hargreaves | 341/22 |
| 6,040,977 A | 3/2000 | Hoffer | |
| 6,241,406 B1 * | 6/2001 | Yan | 400/489 |
| 6,404,621 B2 * | 6/2002 | Zamora | 312/208.4 |
| 6,493,218 B1 | 12/2002 | Fraga et al. | |
| 6,501,462 B1 * | 12/2002 | Garner | 345/173 |
| 6,697,251 B1 | 2/2004 | Aisenberg | |
| 7,649,478 B1 * | 1/2010 | Yoon | 341/22 |
| 2002/0191999 A1 * | 12/2002 | Katz | 400/472 |
| 2004/0066374 A1 * | 4/2004 | Holloway et al. | 345/168 |
| 2005/0078090 A1 * | 4/2005 | Glatzer et al. | 345/168 |
| 2006/0034038 A1 | 2/2006 | Hou | |
| 2006/0125796 A1 * | 6/2006 | Utz et al. | 345/168 |
| 2007/0205919 A1 | 9/2007 | Wu | |
| 2008/0075517 A1 * | 3/2008 | Vuong | 400/486 |
| 2008/0246731 A1 * | 10/2008 | Chechelniker | 345/168 |
| 2009/0146960 A1 * | 6/2009 | Gim | 345/172 |
| 2011/0280641 A1 * | 11/2011 | Jiang | 400/486 |
| 2011/0305494 A1 * | 12/2011 | Kang | 400/489 |
| 2012/0111173 A1 * | 5/2012 | Bowen | 84/170 |
| 2012/0112931 A1 * | 5/2012 | May | 341/22 |
| 2012/0112932 A1 * | 5/2012 | May | 341/22 |

* cited by examiner

*Primary Examiner* — Alexander Eisen
*Assistant Examiner* — Nelson Lam
(74) *Attorney, Agent, or Firm* — Birch, Stewart, Kolasch & Birch, LLP

(57) ABSTRACT

An input device includes a small footprint keyboard with touch pad functionality. By disposing the touchpad and the mouse keys in the lower part and surrounded by the first and the second groups, one achieves a substantial ergonomic advantage in that the frequently used QWERTY keys are accessible, while at the same time the touch pad is within reach of any finger.

7 Claims, 3 Drawing Sheets

KEYBOARD ARRANGEMENT IN FOUR GROUPS

BACKGROUND OF THE INVENTION

1. Field of the Invention

The present disclosure relates generally to an input device, more specifically a small footprint keyboard with embedded touch pad functionality.

2. Background Information

The proliferation of mobile devices has increased focus on convenient, compact and feature rich keyboards. The traditional PC-compatible keyboard, known as "QWERTY", from the standard array of letters required for the habitual recognition in the touch-type-method, is too large and bulky for portable devices. A number of solutions exist, but most of them compromise with either the QWERTY, or other sides to the keys and commands needed for full compatibility. The limit to the anatomical acceptance of the size of a single normal dynamic (not tactile) key, seems to bottom out at approximately 12.5 mm in width. It should be noted that by "QWERTY" a wide range of keyboard layouts should be understood though there are certain national variations that changes the order of the keys. It should also be noted that the mechanical properties of keys can differ significantly. For fast touch type work keyboard with keys with noticeable travel depth before closing a switch is found to be efficient, herein referred to as touch method keyboard, TMK. An alternative type is here referred to as tactile type where a metal dome acts as a spring that gives a distinct sensory feedback on closing the key over a short distance that can be less than 0.5 mm.

From the known art the traditional laptop keyboard should be noted where a feature rich keyboard is placed at the upper part of a working surface with a touch pad below, partly inside a larger area used for hand rests and stabilisation when typing. This keyboard is large as it is, and is hard to reduce in size any further, without rethinking the strict rectangular arrangement, by which all traditional solutions are recognized. Adding a touch pad mouse to this array in any reasonable combination with the QWERTY work position, inevitably expands the rectangular depth of the working surface of the device to a wasteful degree, and contradicts the possibilities of compressing it along with any reduction of form factor.

The keyboard or keypad can be a restriction on the degree of miniaturisation and from the known art the cell phone keyboard should be noted where each key is overloaded with functionality while other functions are completely reworked such as touch pad transferred to functionality within a touch sensitive screen, removed such as mouse keys.

Along with the various keyboards a number of optional pointing devices may be attached or related to said keyboards. Mechanical pointing means known as mouse are common with stationary computers and frequently used with laptops. A mouse usually requires a large flat surface for proper operations, a constraint that can be too limiting in mobile use.

Laptops are frequently equipped with a touchpad as a pointing device, a large area disposed below the keys of the keyboard. This extends the depth of the laptop surface significantly and becomes a limiting factor regarding miniaturisation.

As a further alternative laptops are frequently equipped with a small control stick type pointing device in the middle of the keyboard. The latter has remained largely out of favour due to unsatisfactory precision and stability.

Finally there are other alternatives that have had limited success such as pointing directly at a touch sensitive screen, optionally using a stylus, trackballs disposed near the keyboard, typically to the right, and inverted optical mouse systems as a non-mechanical alternative to a trackball.

The inventor of the present invention has identified this traditional thinking as a limiting factor and thus a problem, and found a need in the art for a keyboard that retains most of the functionality of a full sized PC keyboard yet operates well in a small form factor, allowing compression of the input surface area.

SUMMARY OF THE INVENTION

The device disclosed herein addresses the above stated needs by providing a small form factor input device. The main objective to be met, is to utilize all the surface area efficiently, within an overall rectangular frame of a keyboard, is achieved by incorporating a touch pad mouse into and blended with the keys in the keyboard array itself. In one aspect, the keyboard is arranged in four distinct groups where the upper group comprises a main part of the keyboard with a QWERTY type keyboard, a lower left group comprising a first group such as function keys (F1 to F12 and more), a lower right group comprising a second group such as numerical keys and arrow keys, and a lower middle part comprising a touchpad with additional mouse keys.

In a preferred embodiment said mouse keys are tactile keys.

The invention has also disclosed that, not only will it allow a smaller form factor, but the achieved small form factor itself, with a typical maximum width of 18 cm, is specifically advantageous to the solution, in that the hand rest now remains outside the device, by the fact that the whole input device in this way is engulfed by the normal grip and position of the hands. Thus the invention reaches a critical point which provides compression efficiency.

BRIEF DESCRIPTION OF THE DRAWINGS

Aspects of the invention are illustrated by way of example and not by limitation in the accompanying drawings wherein.

DETAILED DESCRIPTION OF AN ILLUSTRATIVE EMBODIMENT

The detailed description below in connection with the drawings is a description of a preferred embodiment and is not intended as the only embodiment in which the invention may be practiced.

Figure 1:
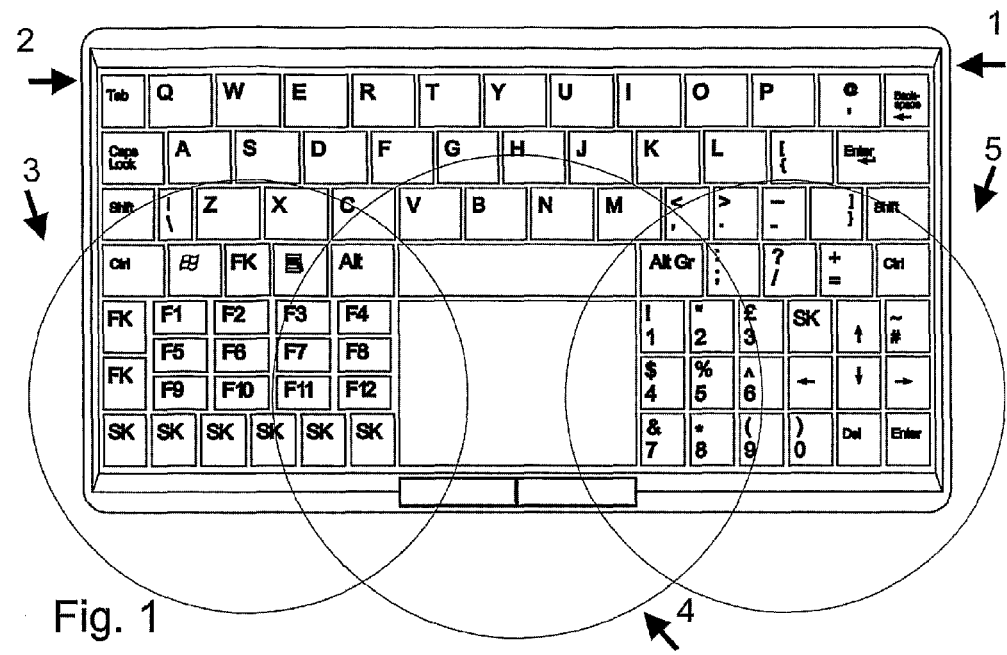
FIG. 1 is a schematic of one embodiment of the invention according to the present disclosure.

FIG. 1 shows an overview of an input device 1 that can be used for small form factor devices. It comprises a plurality of areas, each of which comprises a characteristic group of input functionality. The upper part 2 is substantially a QWERTY type keyboard with certain inseparable extra keys, such as Shift and Enter. The lower part comprises, left to right:

a first group 3 of function keys, a touchpad 4 with mouse keys, and a second group 5 of numerical and arrow keys.

By disposing the touchpad and the mouse keys in the lower part and surrounded by the first and the second group one achieves a substantial ergonomic advantage in that the frequently used QWERTY keys is accessible while at the same time the touch pad is within reach of any finger.

Figure 2:
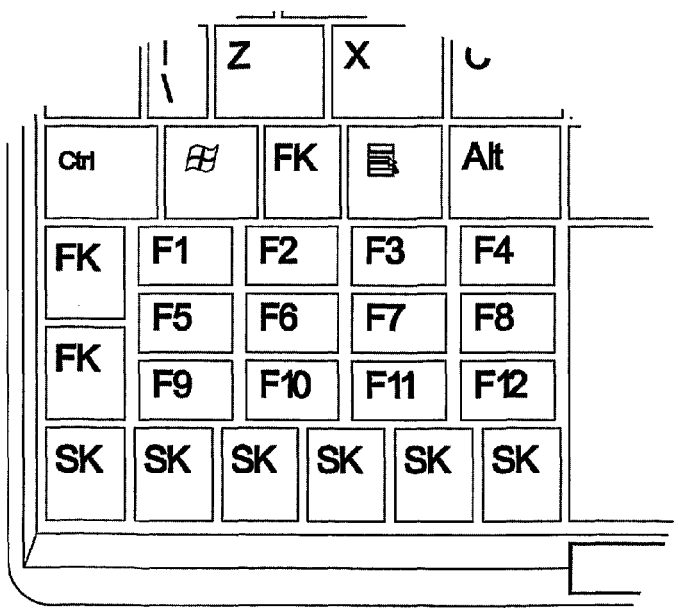
FIG. 2 shows a close-up of the lower left group comprising a first group of function keys.

In a preferred embodiment the keyboard uses keys with noticeable travel depth before closing a switch is found to be efficient, herein referred to as touch method keyboard, TMK FIG. 2 shows a first group of keys in the form of function keys, which are moved from their traditional position at the top of the typical PC keyboard. At this position the user typically curl his or her fingers thus presenting a smaller touch cross section. The inventors have taken advantage of this and have made the less frequently used F-keys narrower, thus fitting in more keys while retaining ergonomic qualities. This design leaves room for added device specific functionality keys, here labelled FK and SK.

Figure 3:
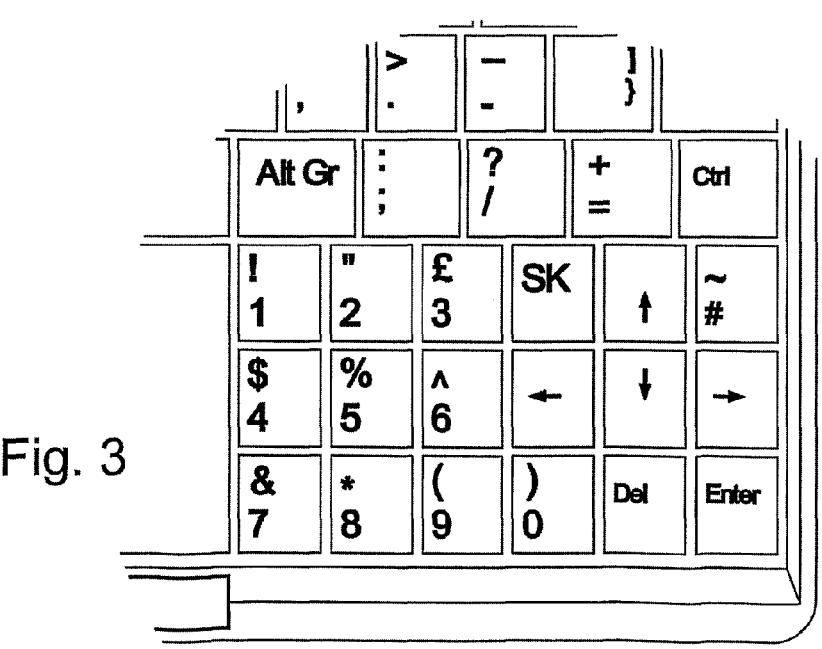
FIG. 3 shows a close-up of the lower right group comprising a second group of numerical keys and arrow keys.

FIG. 3 shows a second group of keys in the form of numerical and arrow keys and related keys.

Figure 4:
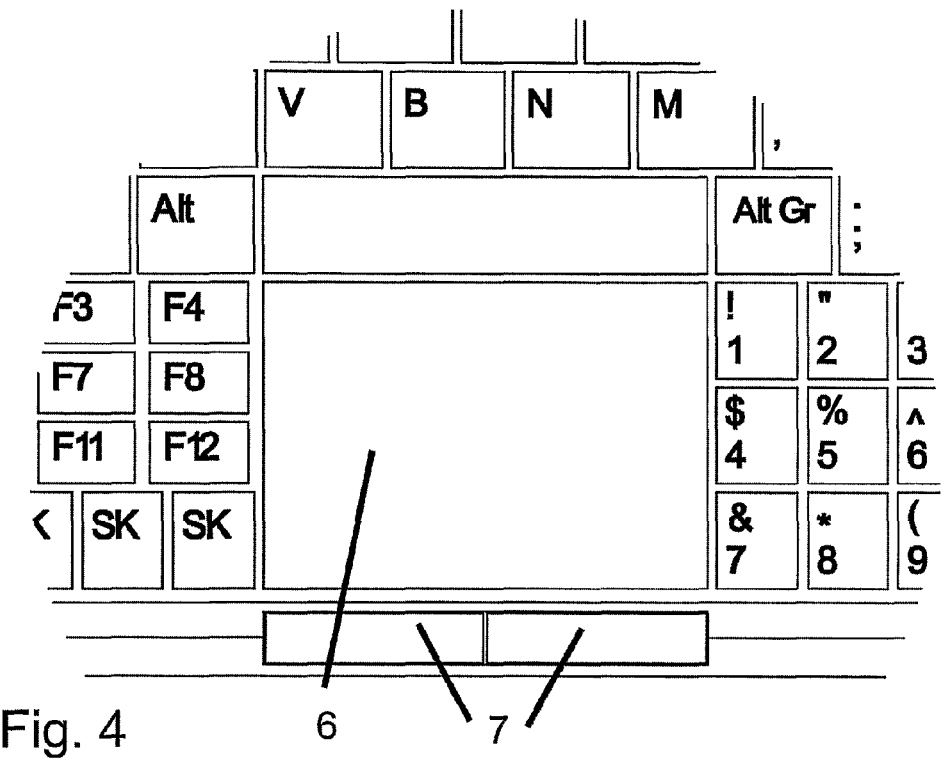
FIG. 4 shows a close-up of the lower middle part comprising a touchpad and mouse keys.

FIG. 4 shows details of a touchpad 6 and mouse keys 7 disposed the lower middle part between the first and the second group of keys. In a further embodiment the mouse keys are of the tactile type in contrast with the TMK used elsewhere. This provides resistance against unintended activation of said mouse keys.

Figure 5:
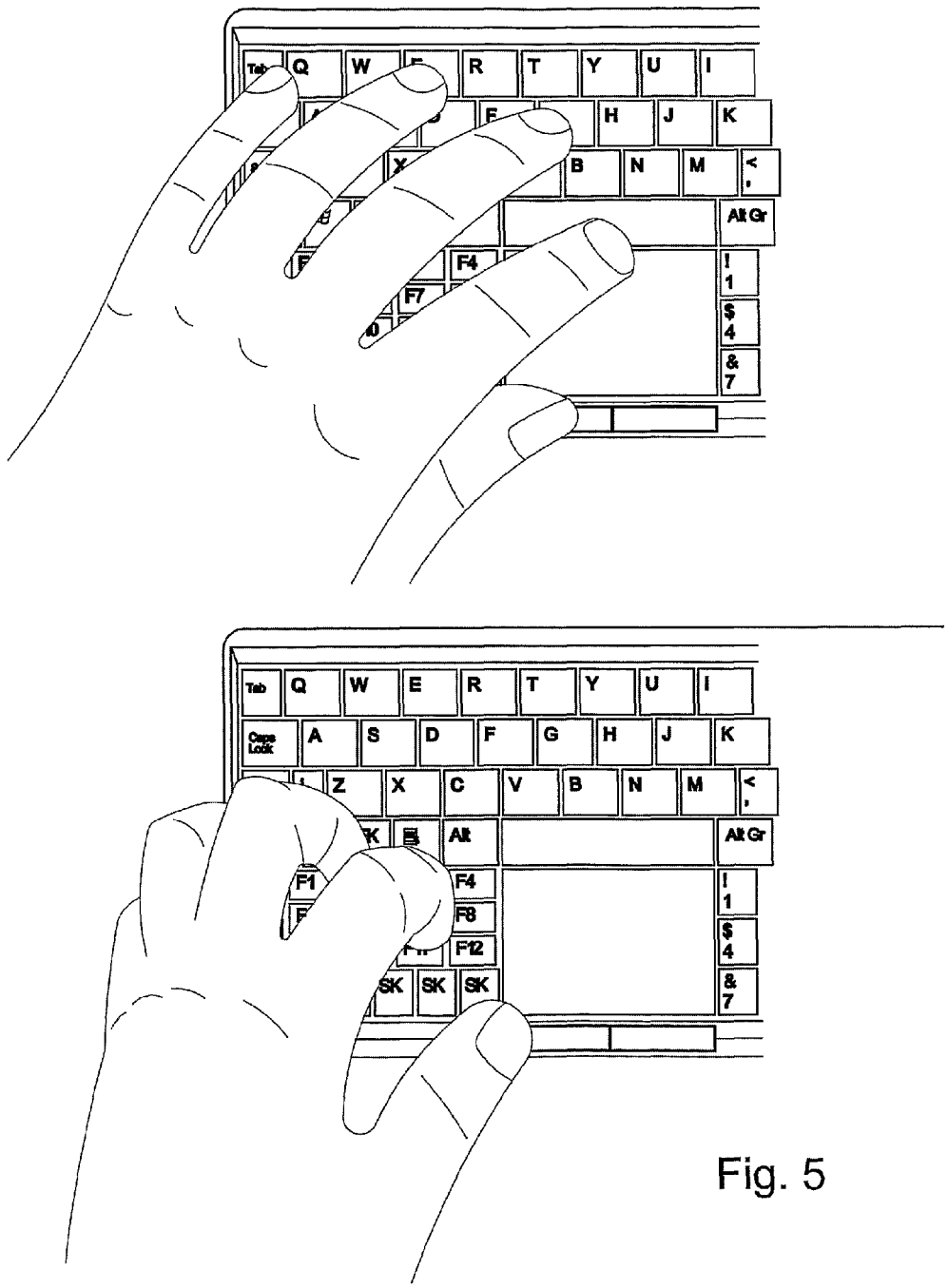
FIG. 5 shows a close-up of a side view of a finger touching keys near the upper part and near the lower part.

FIG. 5 shows a finger touching keys near the upper part and near the lower part. As shown an extended finger touching a first key in the upper part of the input device touches said key over a certain cross section. A curled finger touching a second key in the lower part of the input device touches in contrast said second key with the tip of the finger and therefore touches over a smaller cross section than when touching the first key. This makes it possible to use narrower keys in the lower groups of keys.

The invention claimed is:

1. An input device comprising a small footprint keyboard arranged in four distinct groups including:
   an upper group comprising keys arranged in a QWERTY type keyboard without numerical keys;
   a lower left group comprising function keys;
   a lower right group comprising numerical keys and arrow keys; and
   a lower middle group comprising a touchpad with additional mouse keys,
   wherein the touchpad is disposed between the lower left group and the lower right group in a lower part of the small footprint keyboard,
   wherein the upper group extends over the lower left, lower middle and lower right groups and defines a width of the small footprint keyboard, and the upper group and the lower groups define a height of the small footprint keyboard, and
   wherein said function keys, numerical keys and arrow keys are not duplicated in different groups.

2. The input device according to claim 1, wherein each of the function keys in the lower left group has a narrower touchable area than the keys in the upper group.

3. The input device according to claim 1, wherein the lower left group comprises regular F1-F12 keys and device specific functionality keys.

4. The input device according to claim 1, wherein a numerical key provides a different input symbol when shifted from what it provides when unshifted.

5. The input device according to claim 1, wherein a distance between adjacent groups is substantially equal to a distance between adjacent keys in a group.

6. The input device according to claim 1, wherein a bottom line of the touchpad is flush with bottom lines of the keys in the lower left and lower right groups.

7. The input device according to claim 1, wherein a distance between every two immediately adjacent keys in the four distinct groups and a distance between the touchpad and each immediately adjacent key are both substantially smaller than a width of any key.

* * * * *